(12) United States Patent
Boatright

(10) Patent No.: US 11,974,697 B2
(45) Date of Patent: May 7, 2024

(54) APPARATUS FOR SPILL PREVENTION

(71) Applicant: Kathryn Boatright, Dunwoody, GA (US)

(72) Inventor: Kathryn Boatright, Dunwoody, GA (US)

( * ) Notice: Subject to any disclaimer, the term of this patent is extended or adjusted under 35 U.S.C. 154(b) by 0 days.

(21) Appl. No.: 17/161,187

(22) Filed: Jan. 28, 2021

(65) Prior Publication Data

US 2022/0233022 A1 Jul. 28, 2022

(51) Int. Cl.
*A47J 37/10* (2006.01)

(52) U.S. Cl.
CPC .................................. *A47J 37/108* (2013.01)

(58) Field of Classification Search
CPC ........ A47J 37/108; A47J 43/25; A47J 43/255; A47J 2043/04436; B26B 11/00
USPC ................................ 220/573.1, 731; 99/645
See application file for complete search history.

(56) References Cited

U.S. PATENT DOCUMENTS

| | | | | |
|---|---|---|---|---|
| 178,145 A * | 5/1876 | Hauck | ................... | A47J 37/108 220/4.03 |
| 555,834 A * | 3/1896 | Taylor | ..................... | A47J 43/25 241/291 |
| 1,682,095 A * | 8/1928 | Reyther | ................ | A47J 37/101 126/299 C |
| 1,692,095 A * | 11/1928 | Dudley | .................. | A63G 25/00 472/28 |
| 2,240,454 A | 4/1941 | Badaracco | | |
| 2,611,510 A * | 9/1952 | Willits | ................... | A47J 37/101 126/299 C |
| 4,733,589 A * | 3/1988 | Wolff | ....................... | B26D 1/02 83/858 |
| 4,805,843 A * | 2/1989 | Draper | .................... | A47J 43/25 16/382 |
| 5,531,354 A * | 7/1996 | Uy | ......................... | A47J 37/101 220/366.1 |
| 6,237,470 B1 * | 5/2001 | Adams | .................. | A47J 37/101 220/573.1 |
| 6,829,984 B1 | 12/2004 | Leibowitz | | |
| 7,802,702 B2 | 9/2010 | Archer, Jr. | | |
| 10,517,430 B1 | 12/2019 | Trzcinski | | |
| D882,330 S | 4/2020 | Katz | | |
| 2004/0261630 A1 | 12/2004 | Leibowitz | | |
| 2006/0086258 A1 | 4/2006 | Sharpe | | |
| 2009/0179038 A1 * | 7/2009 | Wong | ..................... | A47G 19/02 220/731 |
| 2011/0290926 A1 * | 12/2011 | Talip | ....................... | A47J 43/25 241/168 |
| 2012/0085850 A1 * | 4/2012 | Tetreault | ................. | A47J 43/25 241/101.2 |
| 2014/0042106 A1 | 2/2014 | Davison et al. | | |
| 2014/0319152 A1 | 10/2014 | Suck | | |
| 2016/0066744 A1 | 3/2016 | Baxi et al. | | |

(Continued)

*Primary Examiner* — J. Gregory Pickett
*Assistant Examiner* — Niki M Eloshway
(74) *Attorney, Agent, or Firm* — DLA PIPER LLP (US)

(57) ABSTRACT

An anti-spill aid for use in cooking and serving vessels may be integrated into the vessel or removable and attachable. The anti-spill aid is an improved cooking tool to prevent messy cooking mishaps. Embodiments can include a removable conformed heat-resistant tool or a non-removable extension of a cookware to enable the upper portion of the cookware to have a curved area that is overarching to assist in meal preparations and prevent food from going over the edge.

16 Claims, 10 Drawing Sheets

(56) References Cited

U.S. PATENT DOCUMENTS

2016/0367079 A1\* 12/2016 Chaudry .............. A47J 37/108
2018/0310759 A1   11/2018 Jenkins et al.

\* cited by examiner

Fig. 1 – Prior Art

APPARATUS FOR SPILL PREVENTION

TECHNICAL FIELD

This application relates to a multi-purpose cooking or serving vessel including an apparatus for reducing spillage of food while cooking or serving in the vessel.

BACKGROUND

Various types of vessels, including cooking and serving vessels are used throughout the kitchen. Generally cooking vessels are used to cook food contents over a heat source. Examples of such vessels can be frying pans, stir fry pans, woks, roasting pans, etc. The cooking vessel sits atop a heat source, e.g., a stove, with a bottom surface near or touching the heat source. The heat is then distributed to other portions of the vessel. Inside the vessel, the heat is the highest at the surface of the vessel most adjacent to the heat source. Thus, food contents that are in contact with the surface are cooked but food content not in contact with the surface may remain largely uncooked. Generally, to remedy this issue, the cook manually moves the uncooked portions of the food contents to be in contact with the vessel surface most adjacent to the heat source. This is commonly referred to as "flipping" the food content. One familiar example of this is flipping an omelet. When cooking an omelet, the bottom portion of the omelet which is in contact with the surface of the cooking vessel is cooked while the top portion of the omelet remains uncooked. To properly prepare the omelet, the cook then must "flip" the omelet so that the top of the omelet comes into contact with the surface of the vessel.

The process of flipping is required for a variety of dishes such as omelets, pancakes, scrambled eggs, fries, hamburgers, fish or any food item that requires mixing, stirring, flipping, or stir-frying. Further, flipping is not limited to flipping the entire food item; at times the cook may want to flip a portion of the item only. For example, in the omelet example, the cook may only want to flip half of the omelet over.

The process of flipping is cumbersome. It is common to have food content spill out of the cooking vessel while flipping. The spilled food may come in contact with the heat source resulting in burning of the food content or more serious hazards such as a potential for fire or skin burns. An experienced cook may be able to reduce the amount of spillage of food content but cannot completely prevent it. Beginner cooks tend to struggle with the flipping process.

The anti-spill aid described herein provides a more efficient way to flip food content without any spillage outside the cooking vessel. For beginners, this anti-spill aid is highly beneficial because it would allow the beginner cook to focus on other aspects of cooking and not worry by spillage or fire risks. For experienced cooks, in addition to eliminating spillage, the anti-spill aid helps in a more efficient and faster flip.

BRIEF DESCRIPTION OF THE DRAWINGS

Various objectives, features, and advantages of the disclosed subject matter can be more fully appreciated with reference to the following detailed description of the disclosed subject matter when considered in connection with the following drawings, in which like reference numerals identify like elements.

DETAILED DESCRIPTION

Reference will now be made in detail to embodiments, examples of which are illustrated in the accompanying drawings. In the following detailed description, numerous specific details are set forth in order to provide a sufficient understanding of the subject matter present herein. But it will be apparent to one of ordinary skill in the art that the subject matter may be practiced without these specific details. Moreover, the particular embodiments described herein are provided by way of example and should not be used to limit the scope of the invention to these particular embodiments.

Described here are embodiments of the anti-spill aid that allows users to prepare or serve food items with minimal or no spillage outside the vessel. One skilled in the art would understand that the anti-spill aid is not limited to use only in the kitchen setting, it may be employed in numerous settings when there is a need to reduce spillage from a vessel.

Figure 1:
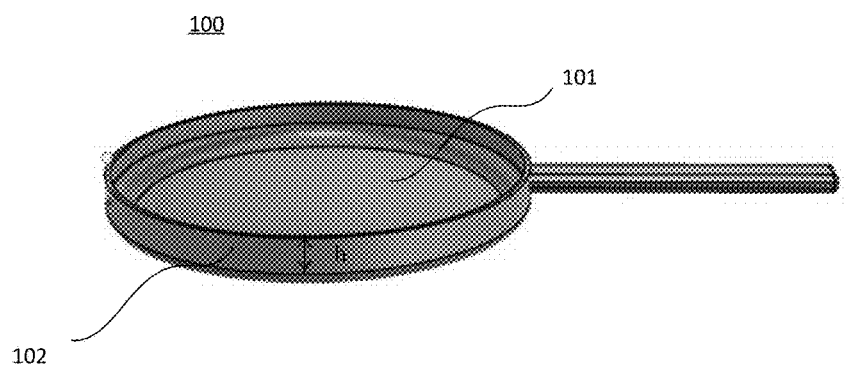
FIG. 1 depicts a prior art pan.

FIG. 1 shows a typical vessel 100. The vessel 100 in FIG. 1 may be a cooking vessel, such as a pan, but it is understood that an anti-spill feature described below, may be part of or attached to any type of vessel that may contain food items. The vessel 100 has a cooking surface area 101. Vessel 100 also has sidewalls 102 which encircle the cooking surface area 101. Sidewalls 102 help contain the food item within the vessel 100. In certain vessels, sidewalls 102 are approximately perpendicular to the cooking surface area 101. In certain other vessels, such as woks, the sidewalls 102 are an extension of the cooking surface area 101. As depicted in FIG. 1, the sidewalls 102 have a height of h. The height h is uniform in all portions of the sidewalls 102.

Figure 2:
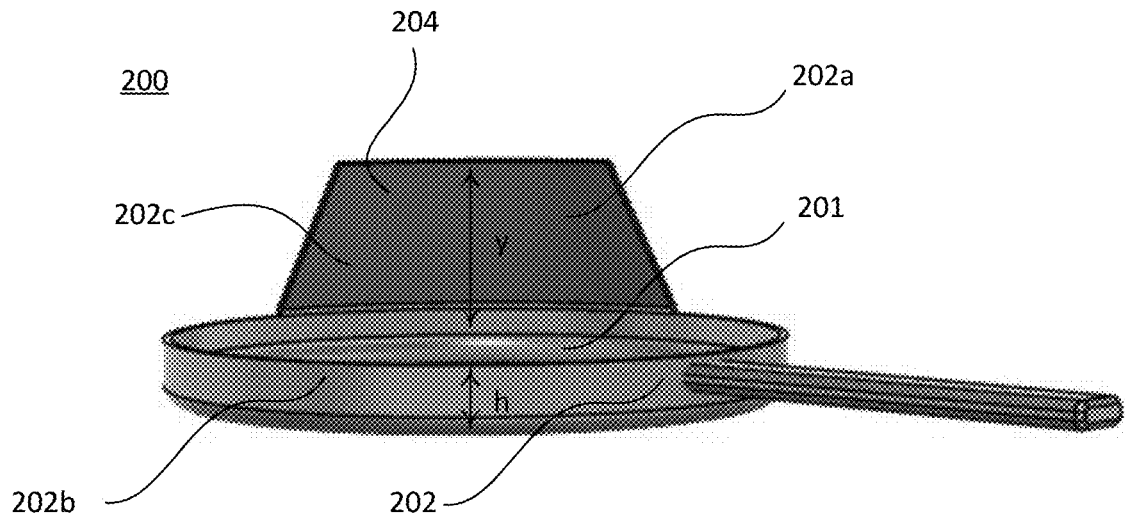
FIGS. 2 and 2a depict one embodiment of a pan and the anti-spill aid, according to embodiments of the disclosure.
Figure 2A:
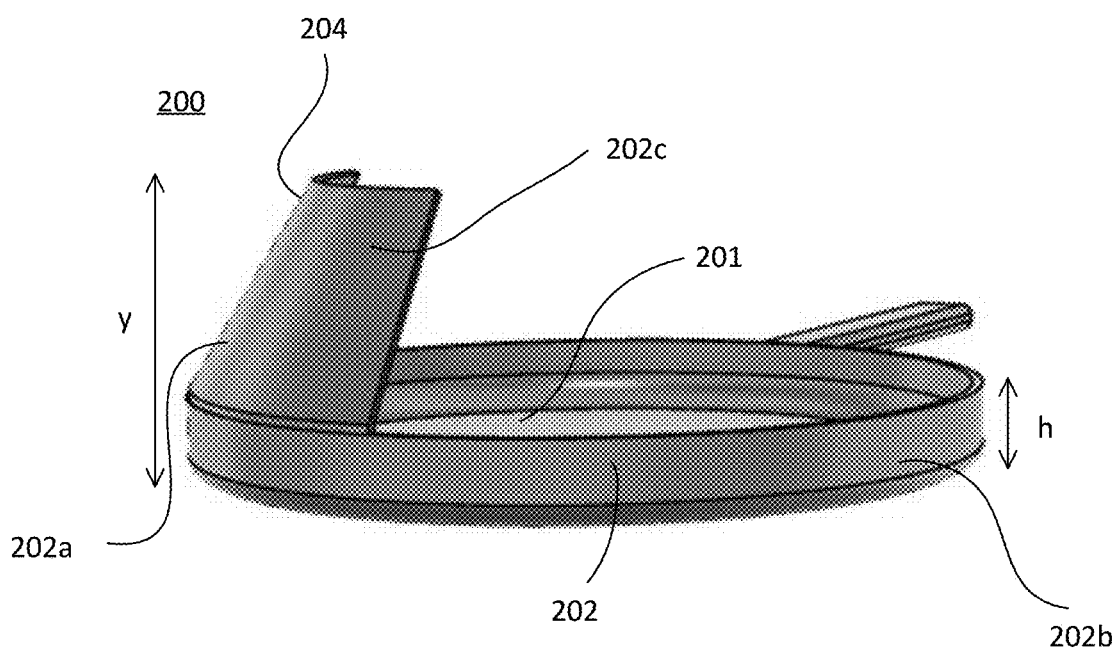

FIG. 2 depicts a cooking vessel 200 with one embodiment of the anti-spill aid 202a and FIG. 2a is a side view of the cooking vessel 200 with the anti-spill aid 202a. As with the typical cooking vessel 100 of FIG. 1, cooking vessel 200 has a cooking surface area 201 and sidewalls 202 which help contain the food item within the cooking surface area 201. However, unlike the typical cooking vessel 100 of FIG. 1, the sidewalls 202 of cooking vessel 200 includes two sidewall portions 202a and 202b of different heights. Portion 202a has height y and portion 202b has height h similar to the known vessel in FIG. 1. The difference between height y and height h can be a wide range. In certain embodiments, height y is greater than height h. Portion 202a with height y serves as the anti-spill aid portion 202c in this embodiment.

In this embodiment as shown in FIGS. 2 and 2a, the anti-spill aid portion 202c may be integrated into the vessel and form part of the vessel 200 or the anti-spill aid portion 202c may be removable. Additionally, in this embodiment as shown in FIG. 2a, a top part 204 of anti-spill aid portion 202c has a concave shape curving inwards towards the cooking area 201 to further contain the food item within the interior cooking area 201. The top part 204 of the anti-spill aid portion 202c may start to curve inwards at the bottom of the anti-spill aid portion 202c or at any point of the height y of the anti-spill aid portion 202c. Additionally, in certain embodiments, the top part 204 may be collapsible into the cooking area 201 for easy storage of the vessel 200 when not in use.

The cooking vessel 200 may be made from a metal material such as stainless steel, copper, iron, titanium, aluminum, Teflon and the like. The anti-spill portion 202c of cooking vessel 200 may be formed of the same material as the cooking vessel 200 or of a different suitable metal material.

In some embodiments, the anti-spill portion 202c may be on a side of the vessel 200 that is not aligned with a handle of the vessel 200 as shown in FIG. 2a. However, the anti-spill aid portion 202c may also be located on the other side of the vessel or on both sides of the vessel that are not directly across from the handle. Furthermore, the anti-spill aid portion 202c may be on a side opposite of the handle or even on the sidewall adjacent to the handle.

With the cooking vessel 200 and the anti-spill aid portion 202c, a user can cause the food item in the cooking area 201 to move towards the anti-spill aid portion 202c by, for example, tilting the vessel or by using a cooking utensil. The anti-spill aid portion 202c would allow the food item to travel up height y some distance and due to its concave shape, anti-spill aid portion 202c would cause the food item to fall back into the vessel 200 resulting in no spillage outside cooking vessel 200.

Figure 3:
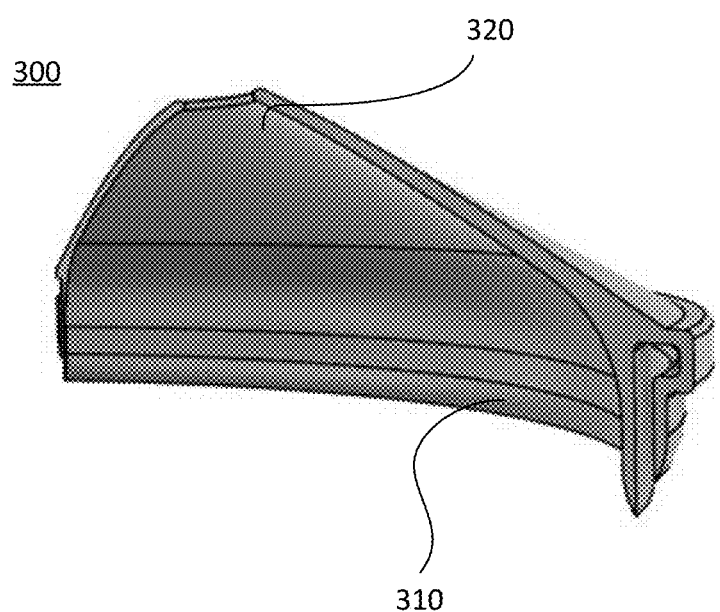
FIG. 3 depicts one embodiment of the anti-spill aid, according to embodiments of the disclosure.

FIG. 3 depicts another embodiment of an anti-spill aid 300. In this embodiment, the anti-spill portion 300 may be removably attached to a vessel with different orientations and may be removed for cleaning. Anti-spill aid 300 has lower portion 310 and an upper portion 320. The upper portion 320 and the lower portion 310 may be manufactured as a single piece or as separate parts.

Typically, when the anti-spill aid 300 is attached to a vessel, only the lower portion 310 may be in contact with the vessel. Thus, when attached to a cooking vessel, the lower portion 310 would be subjected to high temperatures. Therefore, the lower portion 310 is made of materials suitable for high temperatures such as stainless steel, iron, titanium, or other metallic materials. However, in certain embodiments, the lower portion 310 is formed of a flexible material.

In embodiments where the upper portion 320 and the lower portion 310 are not a single piece, the upper portion 320 may be formed of a flexible heat-resistant material (e.g., silicone, conformable molding materials, etc.) that allow a user to safely touch anti-spill aid 300 for adjustment or removal.

Figure 4A:
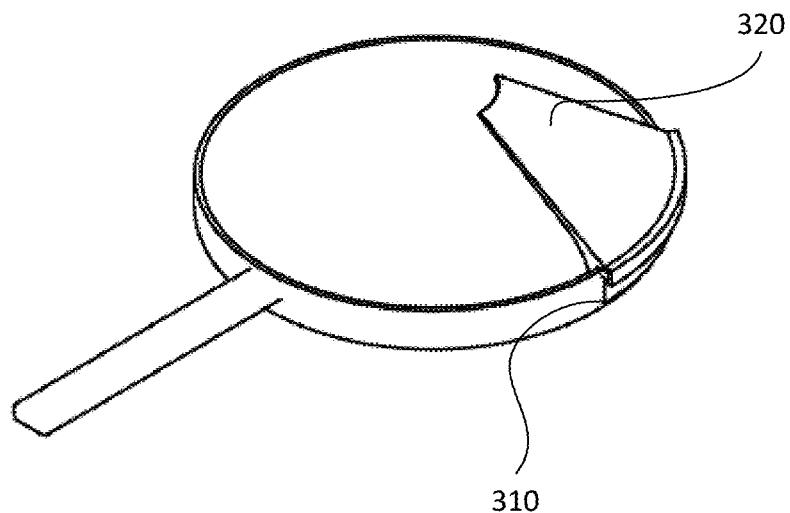
FIGS. 4a-4b illustrate the anti-spill aid of FIG. 3 attached to a pan, according to embodiments of the disclosure.
Figure 4B:
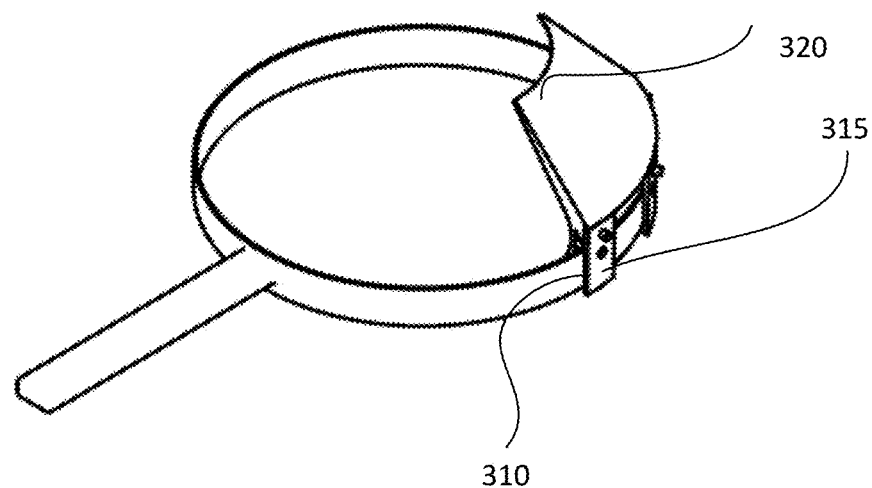

The lower portion 310 comprises an opening into which the sidewall or rim of a vessel can be inserted (shown in FIGS. 4a and 4b). The opening can be of various dimensions to accommodate different sized vessels. If the lower portion 310 is made from a flexible material, then the lower portion 310 may conform to the shape of the vessel. The upper portion 320 has a concave shape facing inwards towards the vessel. The degree of concavity can be vary depending on preference. In certain embodiments, the anti-spill aid 300 is thicker adjacent to the vessel and thins out farther away from the vessel (e.g., the lower portion 310 may be thicker than the upper portion 320).

As depicted in FIG. 4a, lower portion 310 comprises connection mechanisms to connect the anti-spill aid 300 to a vessel. The anti-spill aid 300 can be attached by inserting the cooking vessel or serving vessel into a small fitting opening along the lower portion 310 of the anti-spill aid 300. This small opening could be multiple dimensions created to accommodate the thickness of a variety of cookware and kitchenware items. For example, the lower portion 310 may have a valley region into which a top edge of the cooking vessel slides.

Figure 4C:
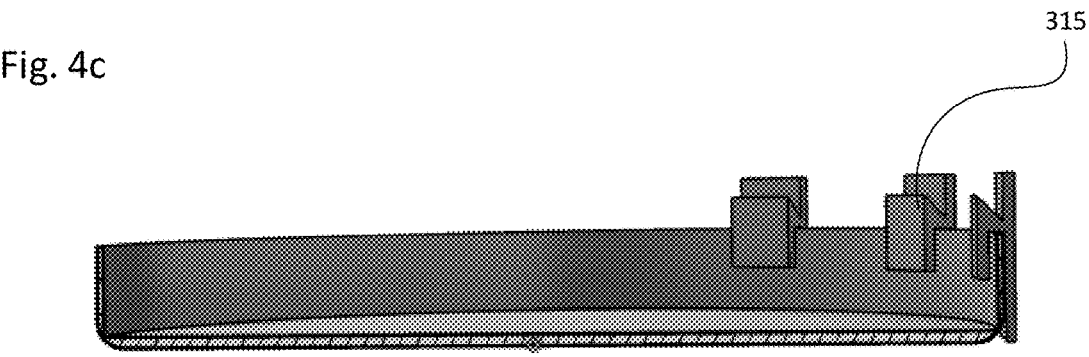
FIGS. 4c-4f illustrate select connection mechanisms of the anti-spill aid, according to embodiments of the disclosure.
Figure 4D:
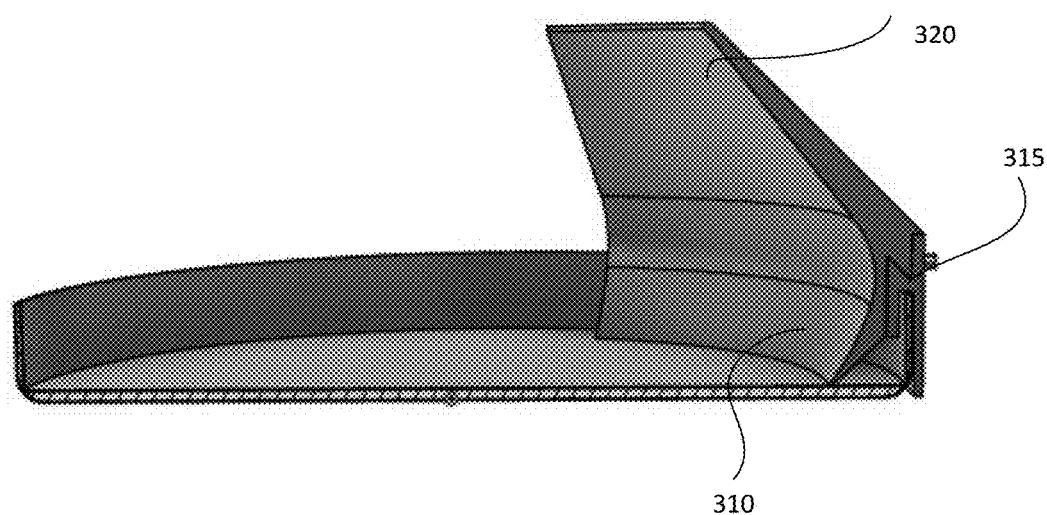

In other embodiments, the anti-spill aid 300 can be connected to the vessel with attachable latches 315 as shown in FIG. 4b. The latches 315 would allow the anti-spill aid 300 to be inserted into corresponding latches of the vessel. Alternatively, the latches 315 of the anti-spill aid 300 may be clamps that grip the sidewalls of the vessel and do not require the vessel to have corresponding latches. The latches may be cam-action clamps, hinged clamps, snaps, buttons, adhesives, and other similar connection mechanisms. In certain embodiments, as depicted in FIG. 4c, latches 315 are stand-alone pieces separate from the lower portion 310 and the vessel. The number of latches can vary depending on vessel size or user preference. In this configuration, the lower portion 310 of the anti-spill aid 300 comprises protrusion and notches corresponding to protrusion and notches of the latches 315. To secure a connection, a protrusion of the lower portion 310 connects with corresponding notches on the latches 315 as depicted in FIG. 4d. The latches 315 are ideally manufactured from Teflon, metal, stainless steel, iron, titanium, aluminum, and any combination of metal and non-metal materials.

Figure 4E:
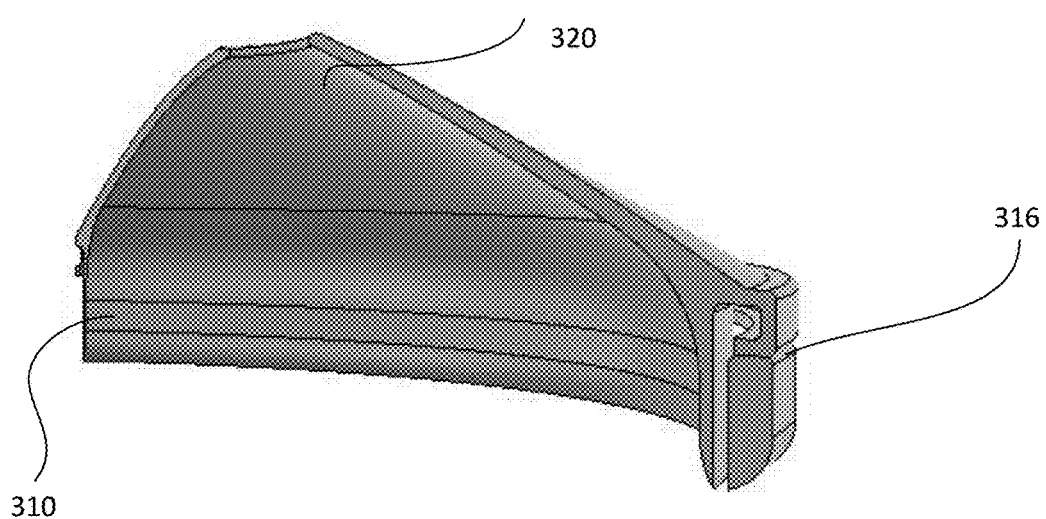
Figure 4F:
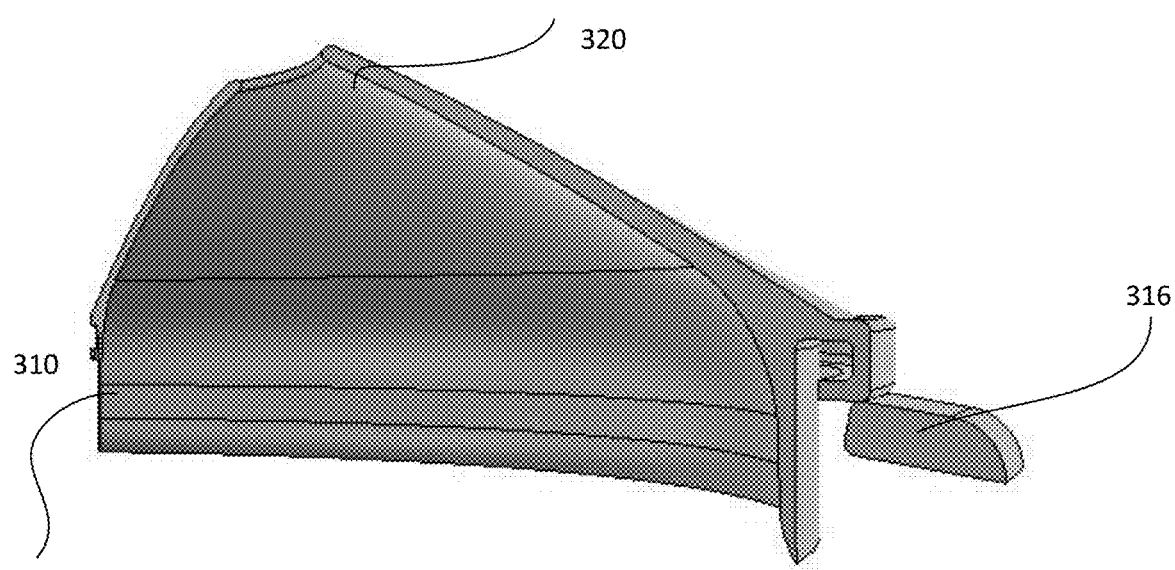

In other embodiments, the anti-spill aid 300 can be connected to the vessel with a hinge-type mechanism 316 as shown in FIGS. 4e and 4f. FIG. 4f depicts the hinge in an open or unlocked position. In the open or unlocked position, the user can easily remove or adjust the anti-spill aid. Once the desired adjustment is made, the user can close or lock the hinge (e.g., by snapping into place) as depicted in FIG. 4e. The hinge-type mechanism 316 may be manufactured from Teflon, flexible metal, stainless steel, iron, titanium, aluminum, and any combination of metal and non-metal materials.

The anti-spill aid 300, as depicted in FIG. 3, can also serve as a splatter guard when cooking. The user can position the anti-spill aid 300 to be directly in-between the user and the vessel during cooking, thereby limiting any food spatter on the user.

Figure 5:
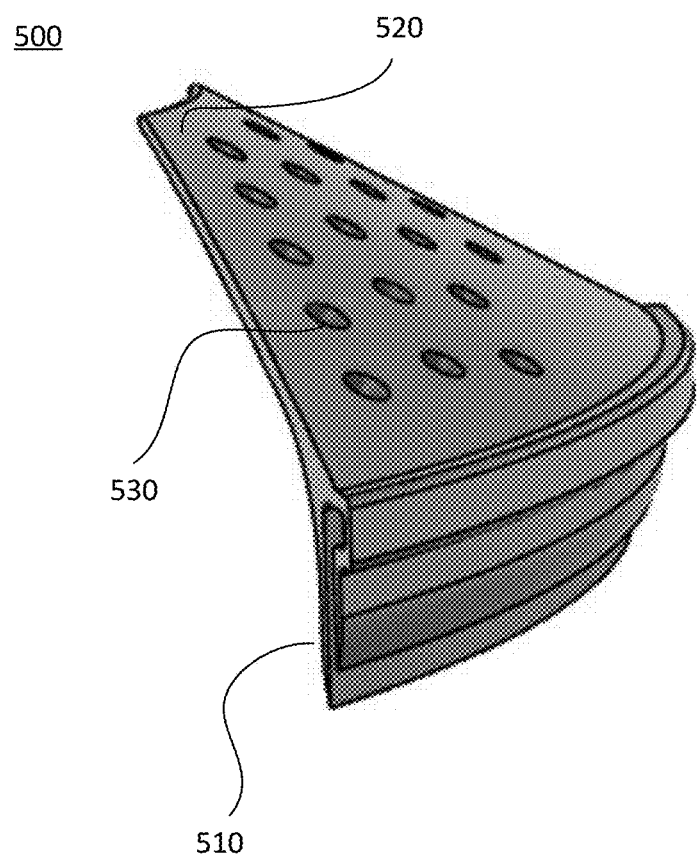
FIG. 5 depicts another embodiment of the anti-spill aid, according to embodiments of the disclosure.

FIG. 5 depicts another embodiment of an anti-spill aid 500. In this embodiment (or in any of the embodiments described herein), the anti-spill aid 500 includes a plurality of holes 530 in a top portion 520 of the anti-spill aid 500. The plurality of holes 530 can serve as a straining mechanism to strain liquids or small food particles. The plurality of holes 530 can be formed of different shapes (e.g., circular, oval, rectangular, star-shaped, etc.). With the anti-spill aid 500, during the flip process, excess cooking oils and greases can be easily expelled from the cooking surface. In other embodiments, the top portion 520 can be formed to additionally serve as a food shredder, grinder, slicer, dice, steamer, utensil holder, or an area to cool food or it may allow for an attachment of such common kitchen tools. Furthermore, the exterior side (i.e., side facing the user) of top portion 520 of anti-spill aid 500 (or in any of the embodiments described above), may be formed with unique shapes for personalization (e.g., engravings, embossing, stenciling, etc. of names or images).

Figure 6:
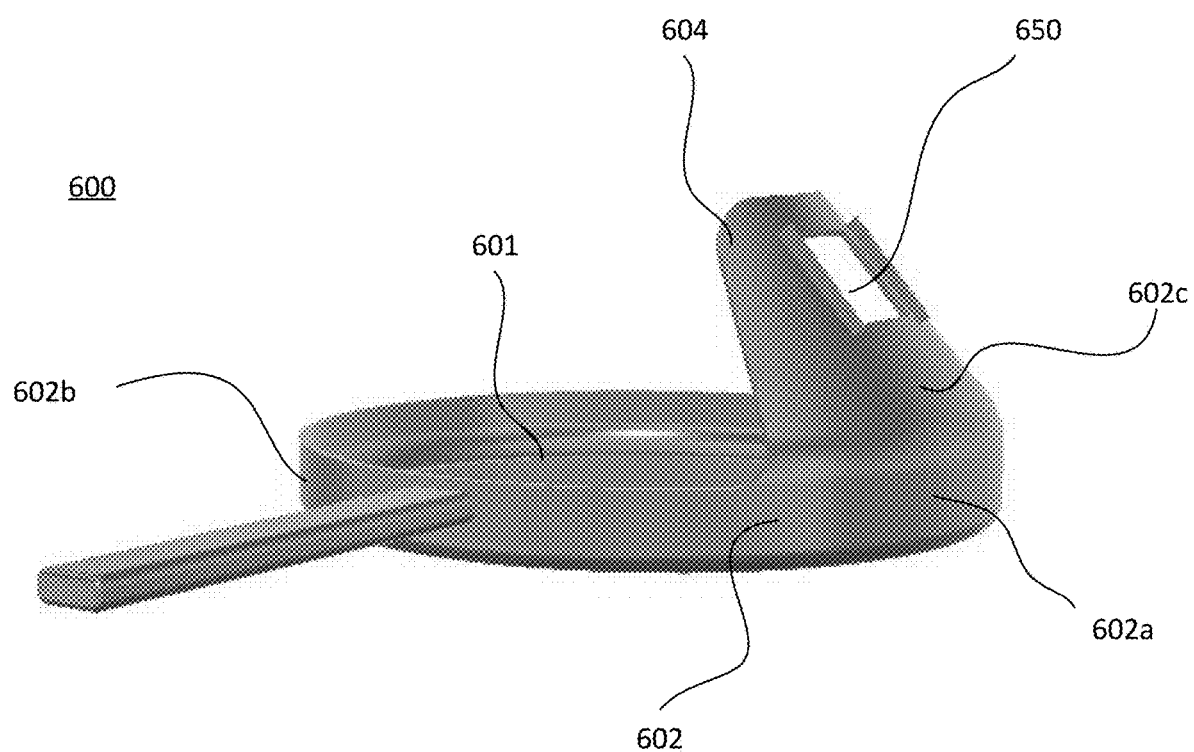
FIG. 6 depicts another embodiment of the anti-spill aid, according to embodiments of the disclosure.
Figure 7A:
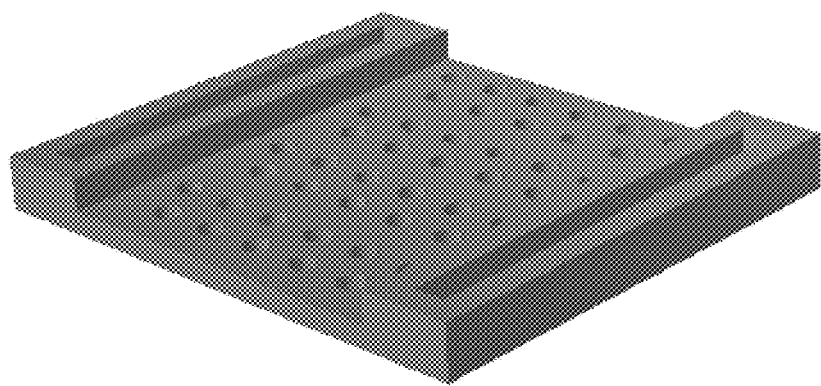
FIGS. 7a-7c depict selected attachments for use with the embodiment of FIG. 6, according to embodiments of the disclosure.
Figure 7B:
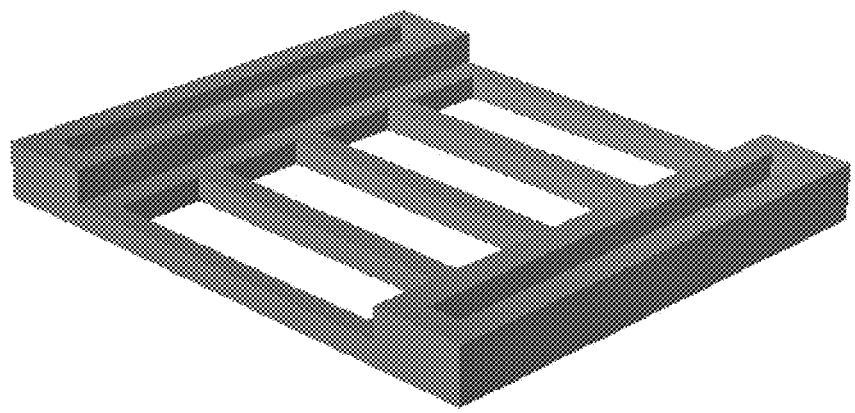
Figure 7C:
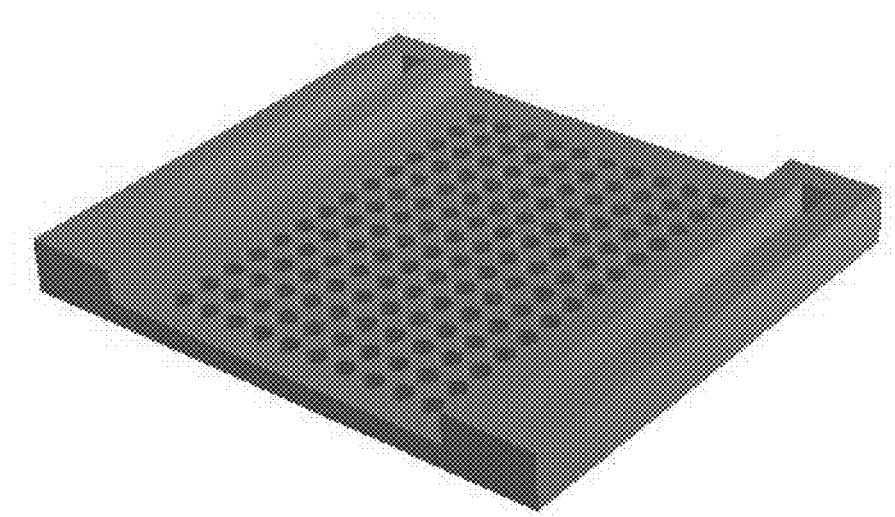
Figure 8A:
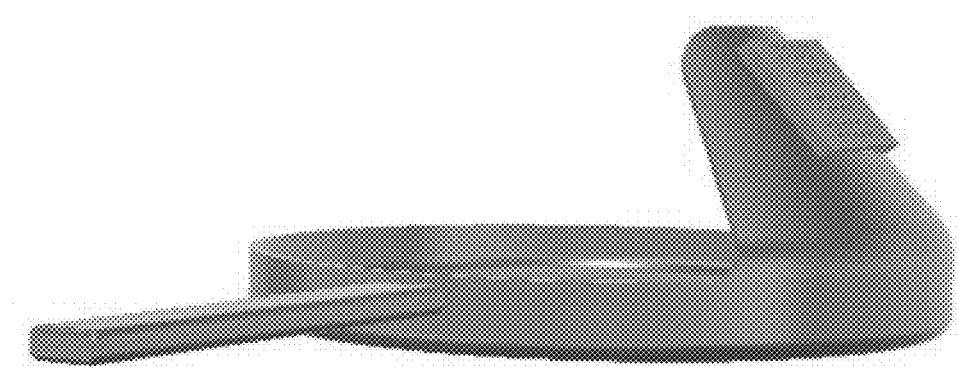
FIGS. 8a-8b depict the embodiment of FIG. 6 with one type of attachment, according to embodiments of the disclosure.
Figure 8B:
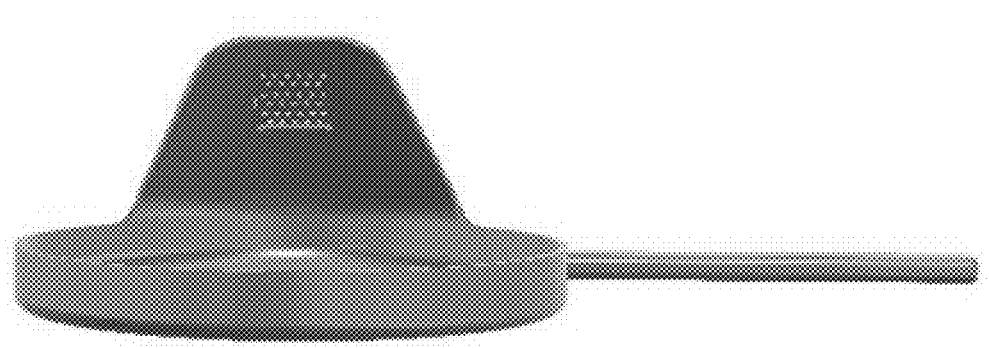

FIG. 6 depicts another embodiment of an anti-spill aid 600. The anti-spill aid 600 is similar to the anti-spill aid 200 of FIG. 2. Cooking vessel 600 has a cooking surface area 601 and sidewalls 602 which help contain the food item within the cooking surface area 601. The sidewalls 602 of cooking vessel 600 includes two sidewall portions 602a and 602b of different heights. Portion 602a has height y and portion 602b has height h similar to the known vessel in FIG. 1. The difference between height y and height h can be a wide range. In certain embodiments, height y is greater than height h. Portion 602a with height y serves as the anti-spill aid portion 602c in this embodiment. A top part 604 of anti-spill aid portion 602c has a concave shape curving inwards towards the cooking area 601 to further contain the food item within the interior cooking area 601. The top part 604 of the anti-spill aid portion 602c may start to curve inwards at the bottom of the anti-spill aid portion 602c or at any point of the height y of the anti-spill aid portion 602c. Additionally, the anti-spill aid 600 has an attachment slot 650. The attachment slot 650 is generally located at the top part 604 of the anti-spill aid portion 602c. The attachment slot is depicted as a rectangular shape in FIG. 6, but it can be a variety of shapes (e.g., circular, triangular, etc.). The attachment slot 650 can be used to attach various inserts that further aid in the cooking process. For example, a shredder insert can be attached to the attachment slot 650. With such a configuration, the user can shred food items directly into the vessel. FIGS. 7a-7c depict examples of types of inserts (shredder, slicer, mincer, respectively) that can be used in the attachment slot. The removable inserts could be any type of device that allows for cutting food (e.g., shred, dice, mince, julienne, slice, cube, brunoise, chiffonade, zest, etc.). FIGS. 8a-8b depict a shredder insert in the attachment slot 650.

It is to be understood that the disclosed subject matter is not limited in its application to the details of construction and arrangements set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other designs, structures, methods, and systems for carrying out the several purposes of the disclosed subject matter. Therefore, the claims should be regarded as including such equivalent constructions insofar as they do not depart from the spirit and scope of the disclosed subject matter.

As used herein, the singular forms "a", "an", and "the" are intended to include the plural forms as well, unless the context clearly indicates otherwise. It will be further understood that the terms "includes" and/or "including", when used in this specification, specify the presence of stated features, steps, elements, and/or components, but do not preclude the presence or addition of one or more other features, steps, elements, components, and/or groups thereof.

As used herein, the terms "and/or" and "at least one of" include any and all combinations of one or more of the associated listed items.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter.

The invention claimed is:

1. A vessel, comprising:
   a flat surface;
   a sidewall encircling an outer perimeter of the flat surface;
   the sidewall comprising a first sidewall portion and a second sidewall portion, wherein a height of the first sidewall portion is greater than a height of the second sidewall portion, and wherein the first sidewall portion is removable; and
   the first sidewall portion having an upper sidewall portion that includes a top surface and two side portions forming a trapezoidal shape, the top surface comprising a uniform height and comprises a lateral curvature that corresponds with a curvature of the sidewall, each of the two side portions disposed between the top surface to the first sidewall portion at an angle, the upper sidewall portion consistently uniform across the upper sidewall without any aperture and extending above the height of the second sidewall portion and having a concave shape facing towards the flat surface.

2. The vessel of claim 1, wherein the vessel is a cooking vessel.

3. The vessel of claim 1, wherein the vessel is a serving vessel.

4. The vessel of claim 1, wherein the flat surface is a cooking surface.

5. The vessel of claim 1, wherein the flat surface and the sidewall are integrally formed.

6. An attachable device, comprising:
   an upper portion and a lower portion connected together and each formed of heat-resistant material;
   the lower portion comprising a connection mechanism for attaching the attachable device to a rim of a vessel; and
   the upper portion that includes a top surface and two side portions forming a trapezoidal shape, the top surface comprising a uniform height and comprises a lateral curvature that corresponds with a curvature of the sidewall, each of the two side portions disposed between the top surface to the first sidewall portion at an angle, the upper portion consistently uniform across the upper portion and having a concave shape facing towards a bottom surface of the vessel.

7. The device of claim 6, wherein the device conforms to the shape of the vessel.

8. The device of claim 6, wherein the connection mechanism comprises an opening.

9. The device of claim 6, wherein the connection mechanism comprises cam-action clamps, hinged clamps, snaps, buttons, adhesives, springs, wing nuts, hooks or other similar connection mechanisms.

10. The device of claim 6, wherein the upper portion and lower portion are a single component.

11. The device of claim 6, wherein the upper portion and lower portion are separate components.

12. The device of claim 6, wherein the upper portion includes an opening into which a cutting mechanism for a piece of food is placed into the upper portion.

13. The device of claim 12, wherein cutting mechanism comprises a tool to shred, dice, mince, julienne, slice, cube, brunoise, chiffonade, zest, or any combination thereof.

14. A vessel, comprising:
a flat surface;
a sidewall encircling an outer perimeter of the flat surface;
the sidewall comprising a first sidewall portion and a second sidewall portion, wherein a height of the first sidewall portion is greater than a height of the second sidewall portion;
the first sidewall portion having an upper sidewall portion extending above the height of the second sidewall portion and having a concave shape facing towards the flat surface, wherein the first sidewall portion is removable; and
the upper sidewall portion that includes a top surface and two side portions forming a trapezoidal shape, the top surface comprising a uniform height and comprises a lateral curvature that corresponds with a curvature of the sidewall, each of the two side portions disposed between the top surface to the first sidewall portion at an angle, the upper sidewall portion consistently uniform across the upper sidewall except for a single opening into which an external cutting mechanism is configured to be placed.

15. The vessel of claim 14, wherein the cutting mechanism is inserted into the opening.

16. The vessel of claim 14, wherein the cutting mechanism comprises a tool to shred, dice, mince, julienne, slice, cube, brunoise, chiffonade, zest, or any combination thereof.

\* \* \* \* \*